United States Patent [19]

Shimizu

[11] Patent Number: 5,452,303
[45] Date of Patent: Sep. 19, 1995

[54] COMMUNICATION APPARATUS COMPRISING A LOCAL PROCESSOR FOR PROCESSING A BROADCAST FRAME

[75] Inventor: Masako Shimizu, Tokyo, Japan

[73] Assignee: NEC Corporation, Tokyo, Japan

[21] Appl. No.: 991,644

[22] Filed: Dec. 16, 1992

[30] Foreign Application Priority Data

Dec. 16, 1991 [JP] Japan .................. 3-330984

[51] Int. Cl.$^6$ .......................................... H04L 12/28
[52] U.S. Cl. .................. 370/94.1; 370/110.1; 340/825.52; 364/242.95
[58] Field of Search .......... 370/60, 60.1, 85.1, 370/85.13, 85.14, 85.15, 94.1, 94.2, 94.3, 92, 110.1; 395/200; 364/242.94, 242.95, 242.96, 240, 240.8; 340/825.52, 825.53

[56] References Cited

U.S. PATENT DOCUMENTS 4,621,362 11/1986 Sy ........................ 370/85.14
4,644,542 2/1987 Aghili et al. ............ 395/200
5,245,607 9/1993 Caram ................... 370/94.1

Primary Examiner—Hassan Kizou
Attorney, Agent, or Firm—Sughrue, Mion, Zinn, Macpeak & Seas

[57] ABSTRACT

In a communication apparatus communicating with a plurality of communication stations in a communication network system by the use of a broadcast frame, a local processor is included in addition to a main processor to preliminarily judge whether or not the broadcast frame is to be received by the communication apparatus. In the local processor, when reception conditions are not satisfied, the broadcast frame is rejected. When the conditions are satisfied, the broadcast frame is received. Such conditions are used as a judgement criterion in the broadcast frame and are compared with a broadcast reference signal in the local processor to select the broadcast frame. The main processor may process only the selected broadcast frame rather than all broadcast frames. Thus, resulting in a reduction of jobs.

9 Claims, 2 Drawing Sheets

FIG. I

COMMUNICATION APPARATUS COMPRISING A LOCAL PROCESSOR FOR PROCESSING A BROADCAST FRAME

BACKGROUND OF THE INVENTION

This invention relates to a communication apparatus which is operable as a node station in a communication network system and which is communicable with the other node stations.

As a communication network system of the type described, known is a local area network system comprising a plurality of node stations which are connected to one another like a loop to transmit or receive a sequence of data signals to or from the other node stations. Each of the node stations may be referred to as a communication apparatus communicable with the others through the loop. The data signal sequence is divided into a succession of data frames. In this event, an address is assigned to each of the communication apparatus to individually specify the communication apparatus.

In the communication network system, it often happens that an identical data signal is delivered to a plurality of the communication apparatus through the loop and is sent to the respective communication apparatus by the use of a broadcast frame. The broadcast frame is distinguished from the remaining data frames by the use of a specific information signal which is indicative of the broadcast frame and which is located at a predetermined time slot in the broadcast frame.

In the meanwhile, it is a recent trend that a wide variety of information signals are transmitted by the use of the broadcast frame to be given to a plurality of the communication apparatus in parallel. This shows that various kinds of the broadcast frames are transmitted on the loop and received by the plurality of the communication apparatus.

However, all of the broadcast frames may not be always delivered to and received by all of the communication apparatus connected to the loop. Under the circumstances, the communication apparatus should individually judge whether or not reception broadcast frames include data signals necessary for the respective communication apparatus and should discard the data signals, if they are unnecessary for the communication apparatus.

To this end, each of the node stations or communication apparatus is provided with an information processing device composed of a main processor.

Herein, it is to be noted that such a main processor should process a great number of jobs in connection with communication carried out among the communication apparatus on the loop. Therefore, when judgement of such a broadcast frame is made in the main processor in addition to the above-mentioned jobs, a heavy load is excessively imposed on the main processor. This results in a reduction of throughput of the main processor.

SUMMARY OF THE INVENTION

It is an object of this invention to provide a communication apparatus which is capable of lightening a load imposed on a main processor included in the communication apparatus.

It is another object of this invention to provide a communication apparatus of the type described, which is capable of simply processing a broadcast frame.

A communication apparatus to which this invention is applicable is for use in a communication network system which comprises a plurality of communication stations communicable with said communication apparatus. The communication apparatus is operable as one of the communication stations. The communication apparatus responds to a data sequence which is arranged in an individual access frame for individually accessing each of the communication apparatus and the other communication stations and a broadcast frame for accessing a plurality of the communication apparatus and the communication stations included in the local area network system. According to this invention, the communication apparatus comprises receiving means for receiving the data sequence which includes the individual access frame and the broadcast frame, a local processor responsive to the data sequence for preliminarily processing the broadcast frame to detect whether or not the broadcast frame satisfies conditions determined for the communication apparatus and to select the broadcast frame only when the broadcast frame does not satisfy the conditions, and a primary processor coupled to the local processor for processing only the broadcast frame selected by the local processor to operate the primary processor.

DESCRIPTION OF THE PREFERRED EMBODIMENT

Figure 1:
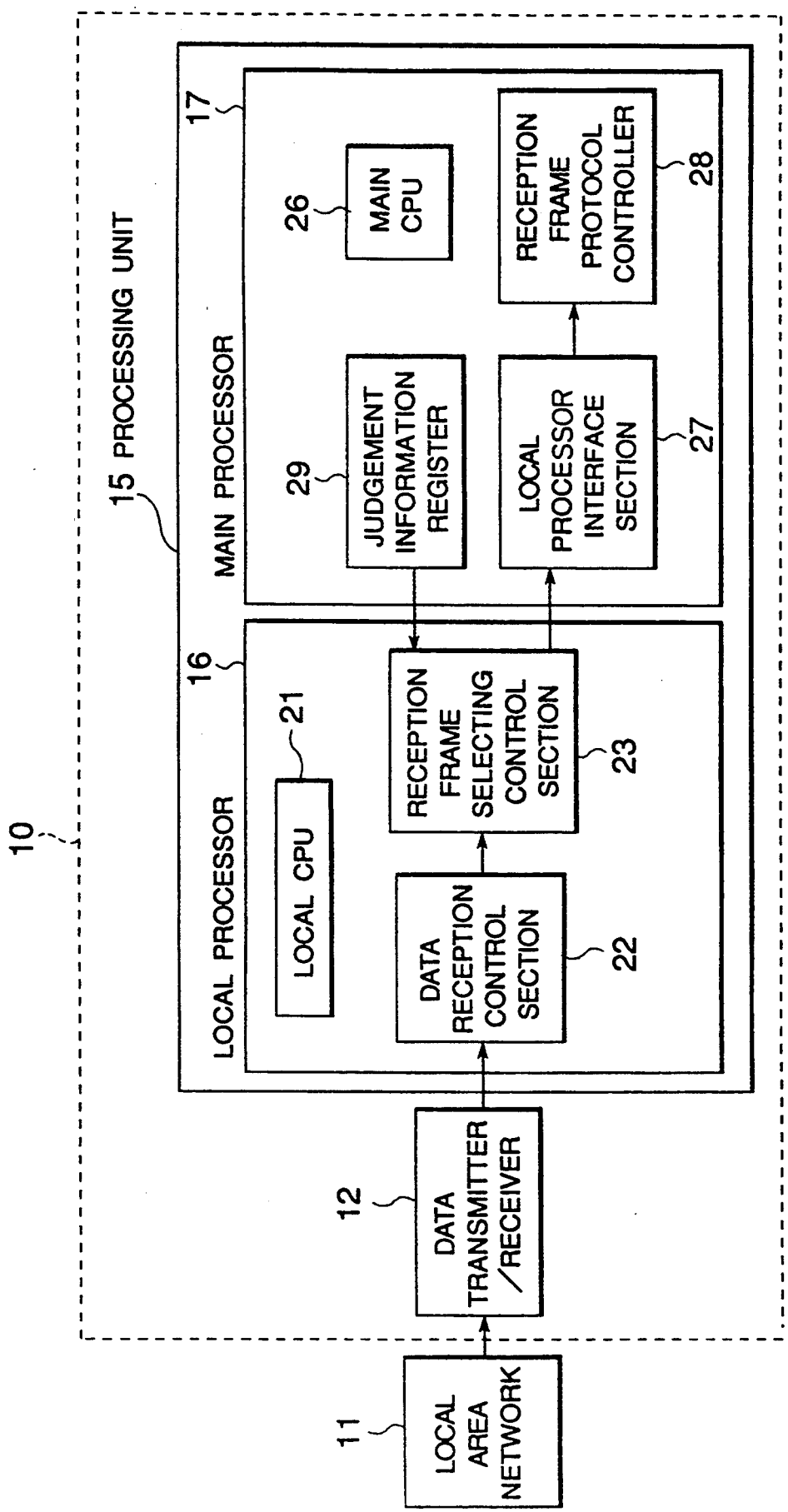
FIG. 1 is a block diagram of a communication apparatus according to a preferred embodiment of this invention, which is used in combination with a local area network.

Referring to FIG. 1, a communication apparatus 10 according to a preferred embodiment of this invention is combined with a local area network (LAN) 11 which includes a plurality of node stations, namely, communication apparatus connected to one another through a loop (not shown) like in the illustrated communication apparatus 10. Communication is carried out among the communication apparatus by the use of a sequence of data signals. The broadcast frame includes or arranges an information signal which is to be delivered to a plurality of the communication apparatus or communication stations.

Herein, each of the communication apparatus may be similar in structure and operation to one another. In this connection, description will be restricted to the illustrated communication apparatus 10.

The communication apparatus 10 comprises a data transmitter/receiver 12 for transmitting or receiving the data signals to or from the local area network 11. Inasmuch as the data signal sequence is divided into a plurality of frames, the data transmitter/receiver 12 transmits a transmission data frame to the local area network 11 and receives a reception data frame destined to the communication apparatus 10. This shows that each of the transmission and the reception data frames includes an address field for arranging an address signal, together with a data field, as will become clear later. In any event, the data frames which are composed of the transmission and the reception data frames are classified into a broadcast frame for accessing a plurality of the communication apparatus and the remaining frames for arranging or transmitting a wide variety of data signals. The broadcast frame serves to deliver a specific data signal to a plurality of the communication apparatus and therefore carries a destination address field for arranging a specific address signal indicative of the broadcast frame. In this connection, the illustrated data transmitter/receiver 12 also carries out reception control of the broadcast frame.

As pointed out in the preamble of the instant specification, various kinds of information signals tend to be transmitted as the specific data signal to the plurality of the communication apparatus all of which might not always be necessary for the information signals.

Taking the above into consideration, the illustrated processing unit 15 is connected to the data transmitter/receiver 12 and comprises a processing unit 15 comprising a local processor 16 and a main processor 17 both of which will be operated in a manner to be described later in detail.

Now, the illustrated local processor 16 is operable to preliminarily process the broadcast frame and to reject the broadcast frame if the broadcast frame is unnecessary for the communication apparatus 10 with reference to a judgement information signal which determines a judgement criterion for judging the broadcast frame. Such a judgement criterion may be given, for example, by a predetermined position of the broadcast frame.

To this end, the local processor 16 comprises a local central processor unit (CPU) 21, a data reception control section 22, and a reception frame selecting control section 23. The data reception control section 22 and the reception frame selecting control section 23 are connected to the data transmitter/receiver 12 and the data reception control section 22, respectively, and are operated under control of the local CPU 21 in a manner to be described later.

On the other hand, the main processor 17 controls the local processor 16 to only process the broadcast frame selected by the local processor 16 in a manner to be described. More specifically, the main processor 17 comprises a main CPU 26, a local processor interface section 27, a reception frame protocol controller 28, and a judgement information register 29. The main CPU 26 controls the local processor interface section 27, the reception frame protocol controller 28, and the judgement information register 29, as will become clear as the description proceeds.

In the illustrated example, consideration may be made about operation which is carried out by the processing unit. 15 on reception of the broadcast frame. Accordingly, description will be restricted to the case where the broadcast frame is received from the local area network 11 through the data transmitter/receiver 12.

Figure 2:
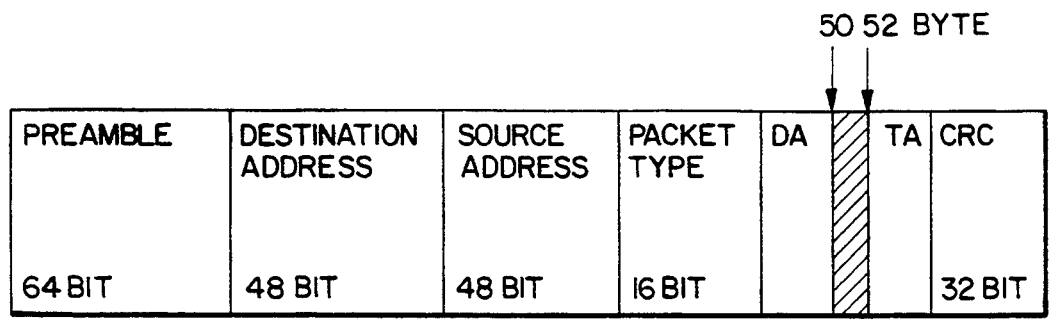
FIG. 2 exemplifies a frame format which is received by the communication apparatus illustrated in FIG. 1.

Referring to FIG. 2, it is assumed that the communication apparatus illustrated in FIG. 1 be used in a local area network known as Ethernet and that each of the broadcast frame and the other frames has a frame format as illustrated in FIG. 2. The frame format has a preamble field of 64 bits, a destination address field of 48 bits, a source address field of 48 bits, a packet type field of 16 bits, a data field of a variable bit length, and a cyclic redundancy check (CRC) field of 32 bits. The data field is variable between a minimum bit length and a maximum bit length. In other words, each of the frames is divisible into first through last bytes.

The broadcast frame is distinguished from the remaining frames by locating a broadcast address of, for example, "FFFFFFFFFFFF"$_{(16)}$ in the destination address field in Ethernet. In the example being illustrated, it is assumed that the judgement criterion is arranged in the data field to judge whether or not the broadcast frame is necessary for the communication apparatus 15. Specifically, the judgement criterion is located in the fiftieth through the fifty-second bytes from the first byte of the broadcast frame, as illustrated by a hatched portion in FIG. 2. The judgement criterion may be represented by three characters each of which is composed of a single byte and which may be, for example, "AAA", "101", or the like.

Referring back to FIG. 1, the judgement information register 29 of the main processor 17 is loaded as judgement information with a broadcast reference signal of, for example, "AAA" to judge whether or not the broadcast frame is to be received by the communication apparatus 10. The broadcast reference signal is representative of the judgement criterion or criteria. Under the circumstances, the broadcast reference signal is set into the reception frame selecting control section 23 in the local processor 16.

The reception frame selecting control section 23 is supplied with the broadcast frame through the data reception control section 22 to detect whether or not the broadcast frame is received and to be compared with the broadcast reference signal set from the judgement information register 29 on reception of the broadcast frame. Thus, the reception frame selecting control section 23 analyzes the broadcast frame in response to the data sequence to select the broadcast frame.

More specifically, the reception frame selecting control section 23 comprises a register section for holding the broadcast reference signal and the data sequence of each reception frame, a detector for detecting whether or not the reception frame specifies the broadcast frame, a selector for selecting the fiftieth through the fifty-second bytes of the broadcast frame to produce three selected bytes, another register for holding the three selected bytes, and a comparator for comparing the three selected bytes with the broadcast reference signal to detect whether or not the broadcast reference signal is coincident with the judgement criterion to produce a result of comparison between the three selected bytes and the judgement criterion. In addition, the illustrated reception frame selecting control section 23 further comprises a control unit for rejecting reception of the broadcast frame on detection of coincidence between the three selected bytes and the broadcast reference signal and, otherwise, for sending the broadcast frame as a selected broadcast frame to the local processor interface section 27 of the main processor 17.

The local processor interface section 27 is supplied only with the selected broadcast frame from the local processor 16 to carry out reception processing in connection with the selected broadcast frame in a known manner. Thereafter, the selected broadcast frame is sent to the reception frame protocol controller 28 to carry out protocol control processing in a manner known in the art. The local processor interface section 27 and the reception frame protocol controller 28 are also operable when the frame destined to the communication apparatus 10 is received through the local processor 16.

Figure 3:
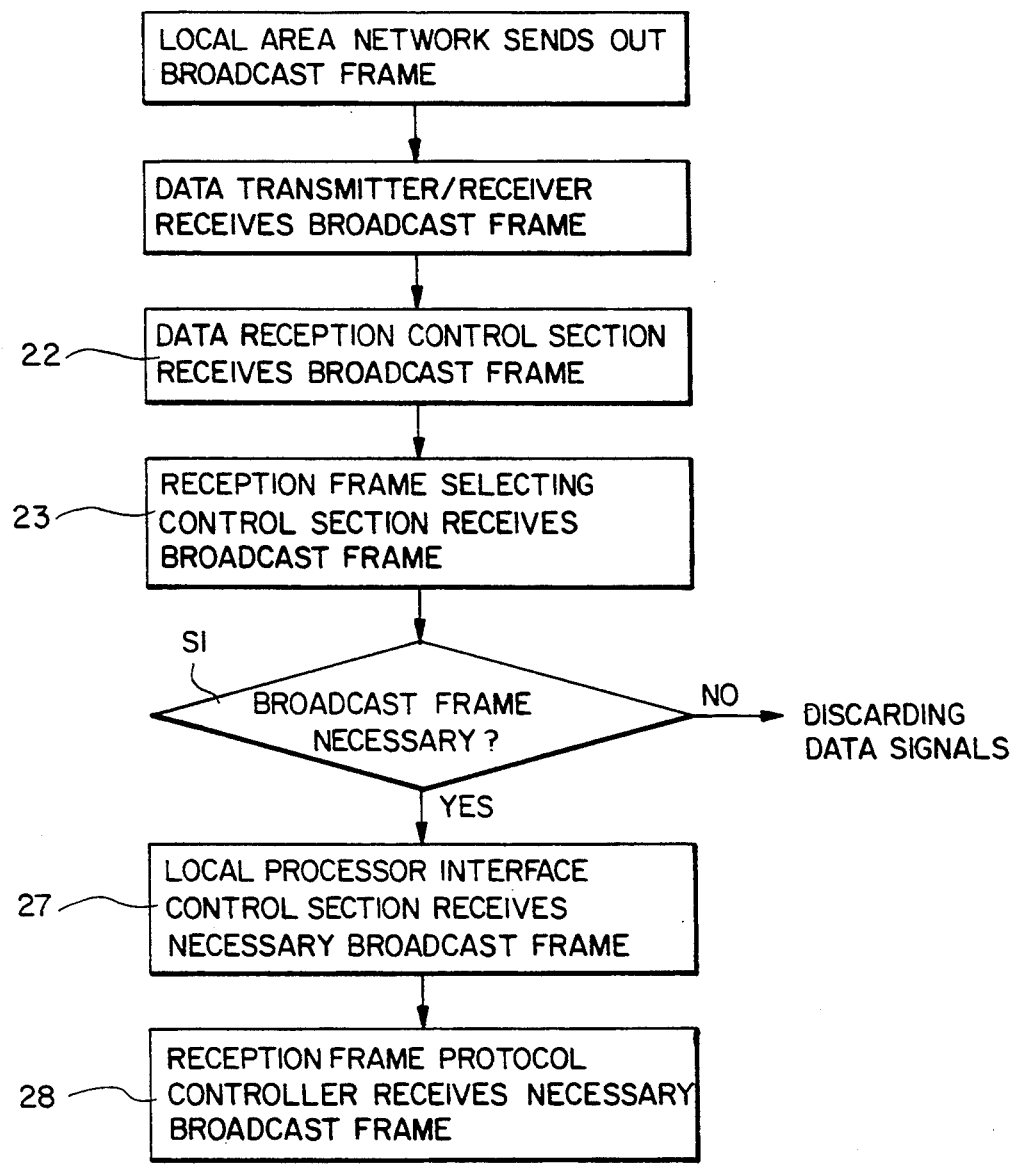
FIG. 3 is a flow chart for use in describing operation of the communication apparatus illustrated in FIG. 1.

Referring to FIG. 3 together with FIG. 1, operation of the communication apparatus 10 illustrated in FIG. 1 will be described in detail for a better understanding of this invention. At first, the reception frame selecting control section 23 is assumed to be previously loaded from the judgement information register 29 of the main processor 17 with the broadcast reference signal so as to select the broadcast frame necessary for the communication apparatus 10. The judgement criterion may specify both an unnecessary broadcast frame and a necessary broadcast frame or may specify either an unnecessary broadcast frame or a necessary broadcast frame, although the unnecessary broadcast frame is assumed to be specified by the judgement criterion in the illustrated example.

In this situation, let the broadcast frame arrive as a reception broadcast frame at the data reception control section 22 through the local network 11 and the data transmitter/receiver 12. The reception broadcast frame is delivered through the data reception control section 22 to the reception frame selecting control section 23, as illustrated in FIG. 3. The reception frame selecting control section 23 analyzes the reception broadcast frame and compares the reception broadcast frame with the broadcast reference signal memorized in the register section. In this event, the data reception control section 22 may be operable to distinguish between the broadcast frame and the other frames, such as an individual access frame.

When the reception broadcast frame is necessary for the communication apparatus, as shown at a step S1 in the reception frame selecting control section 23, the reception broadcast frame is sent as a necessary broadcast frame from the reception frame selecting control section 23 to the local processor interface control section 27 of the main processor 17. The necessary broadcast frame is processed in the manner mentioned in conjunction with FIG. 1.

On the other hand, when the reception broadcast frame is unnecessary for the communication apparatus 10, the reception frame selecting control section 23 discards the reception broadcast frame. Judging the necessary or the unnecessary broadcast frame is carried out by detecting whether or not the judgement criterion is coincident with the broadcast reference signal set in the reception frame selecting control section 23. In the illustrated example, the broadcast frame is judged as the necessary broadcast frame on detection of noncoincidence between the judgement criterion and the broadcast reference signal.

While this invention has thus far been described in conjunction with a preferred embodiment thereof, it will readily be possible for those skilled in the art to put this invention into practice in various other manners. For example, the judgement criterion may be restricted to the above-mentioned embodiment and may be therefore located at a frame position which is different from the fiftieth through the fifty-second bytes of the data field. Various kinds of the judgement criterion or criteria may be transmitted through the local area network. In addition, the communication apparatus may be used not only in the local area network but also in any other networks, for example, a mobile communication network, a satellite communication network, or the like. All of the communication stations may not be always identical with the communication apparatus illustrated in FIGS. 1 and 3 but at least one of the communication stations may have a structure identical with the communication apparatus.

What is claimed is:

1. A communication apparatus for use in a communication network system which comprises a plurality of communication stations which may communicate with said communication apparatus, said communication apparatus being operable as a communication station, said communication apparatus responding to a data sequence which includes an individual access frame for individually accessing said communication stations including said communication apparatus operating as a communication station and a broadcast frame for accessing said communication apparatus and said plurality of communication stations included in said communication network system, said communication apparatus comprising:

receiving means for receiving said data sequence which includes said individual access frame and said broadcast frame;

a local processor responsive to said data sequence for preliminary processing said broadcast frame to detect whether or not said broadcast frame satisfies conditions indicative of an unnecessary broadcast frame in said communication apparatus and to select said broadcast frame only when said broadcast frame does not satisfy said conditions; and a main processor coupled to said local processor for processing only said broadcast frame selected by said local processor.

2. A communication apparatus as claimed in claim 1, wherein said broadcast frame has a destination address field specifying the broadcast frame and a judgement criterion which determines said conditions in said broadcast frame.

3. A communication apparatus as claimed in claim 2, wherein said local processor comprises:

local processor reception means for receiving said data sequence to detect the broadcast frame from said data sequence by monitoring said destination address field; and frame detecting means for detecting whether or not the judgement criterion is included in said broadcast frame to select the broadcast frame only on no detection of the judgement criterion in said broadcast frame.

4. A communication apparatus as claimed in claim 2, wherein said main processor comprises:

holding means for holding a broadcast reference signal which is representative of said judgement criterion;

said local processor comprising:

comparing means coupled to said holding means and supplied with said data sequence for comparing said judgement criterion with said broadcast reference signal to detect coincidence between said judgement criterion and said broadcast reference signal; and means for transmitting the broadcast frame to said main processor only on no detection of the coincidence between said judgement criterion and said broadcast reference signal.

5. A communication apparatus as claimed in claim 2, wherein said judgement criterion is arranged in a predetermined position of the broadcast frame.

6. A communication apparatus as claimed in claim 5, said broadcast frame having a data field in addition to said destination address field, wherein said judgement criterion is arranged in said data field.

7. A communication apparatus as claimed in claim 1, wherein said main processor comprises:
reception means coupled to said local processor for receiving, as a reception broadcast frame, only the broadcast frame selected by said local processor; and
means for processing only said reception broadcast frame.

8. A communication method of processing a broadcast frame which is to be delivered to a plurality of communication stations which are included in a communication network system and each of which comprises a local processor and a main processor, said communication method comprising the steps of:
arranging, in said broadcast frame, a judgement criterion which determines reception conditions in each of said communication stations;
holding, in said local processor of each communication station, a broadcast reference signal corresponding to said judgement criterion;
detecting in said local processor whether or not said judgement criterion in the broadcast frame is coincident with said broadcast reference signal to reject the broadcast frame on coincidence between said judgement criterion and said broadcast reference signal and, otherwise, to send the broadcast frame to said main processor as a selected broadcast frame; and
processing, in said main processor, only said selected broadcast frame.

9. A communication method of processing a broadcast frame which is to be delivered to a plurality of communication stations which are included in a communication network system and each of which comprises a local processor and a main processor, said communication method comprising the steps of:
arranging, in said broadcast frame, a judgement criterion which determines reception conditions in each of said communication stations;
holding, in said local processor of each communication station, a broadcast reference signal corresponding to said judgement criterion;
comparing in said local processor said judgement criterion in the broadcast frame to said broadcast reference signal and selectively rejecting said broadcast frame or sending said broadcast frame to said main processor as a selected broadcast frame based on results of said comparison; and
processing, in said main processor, only said selected broadcast frame.

* * * * *